United States Patent [19]

Begue

[11] Patent Number: 5,062,753
[45] Date of Patent: Nov. 5, 1991

[54] SURVEY NAIL

[76] Inventor: Joseph E. Begue, 2444 S. 8th St., Springfield, Ill. 62703

[21] Appl. No.: 644,278

[22] Filed: Jan. 22, 1991

[51] Int. Cl.$^5$ .................... F16B 15/00; F16B 15/02
[52] U.S. Cl. .................... 411/470; 411/456; 411/485; 411/920; 33/295
[58] Field of Search ............... 411/470, 473, 475, 457, 411/485, 456, 920, 923; 33/293, 295, 299

[56] References Cited

U.S. PATENT DOCUMENTS

| | | | |
|---|---|---|---|
| 1,295,811 | 2/1919 | Stidham et al. | 411/470 |
| 1,378,803 | 5/1921 | Love et al. | 411/470 |
| 2,386,953 | 10/1945 | Hunt | 411/470 |
| 2,533,062 | 12/1950 | Spink | 411/470 |
| 3,059,732 | 10/1962 | Hammack | 33/293 |
| 4,146,969 | 4/1979 | Chaires | 33/295 |
| 4,697,045 | 9/1987 | Beatty | 411/456 |

FOREIGN PATENT DOCUMENTS 841994  7/1960  United Kingdom ............... 411/470

*Primary Examiner*—Neill R. Wilson
*Attorney, Agent, or Firm*—Leon Gilden

[57] ABSTRACT

A nail structure for providing a support surface for subsequent mounting and positioning of elevational rods for utilization particularly in surveying situations. The nail structure includes a first and second spike member orthogonally mounted to a lower or first leg of a generally triangular support truss head when the head is mounted to a main body support, wherein the main body support provides a planar support surface and includes a projection formed at an upper terminal end of the main body support to provide a planar impact head surface for permitting directing of the nail into various structural components such as utility poles. A further improved embodiment of the instant invention includes a benchmark nail structure, wherein a body member is formed with planar body sides for positioning indicator rods utilized in surveying. A coaxially arranged and forwardly extending shank includes a forwardly pointed tip defining a recess positioned along the shank extending rearwardly of the forwardly pointed tip to enhance engagement of the nail structure. The nail member includes an impact head orthogonally mounted to the body component, with the body component defining a top surface orthogonally arranged relative to the coaxially aligned main body and shank, with the top surface including a sighting dimple mounted in coaxial alignment with the shank to define a sighting mark for use by surveyors permitting sighting of linear sighting lines.

5 Claims, 5 Drawing Sheets

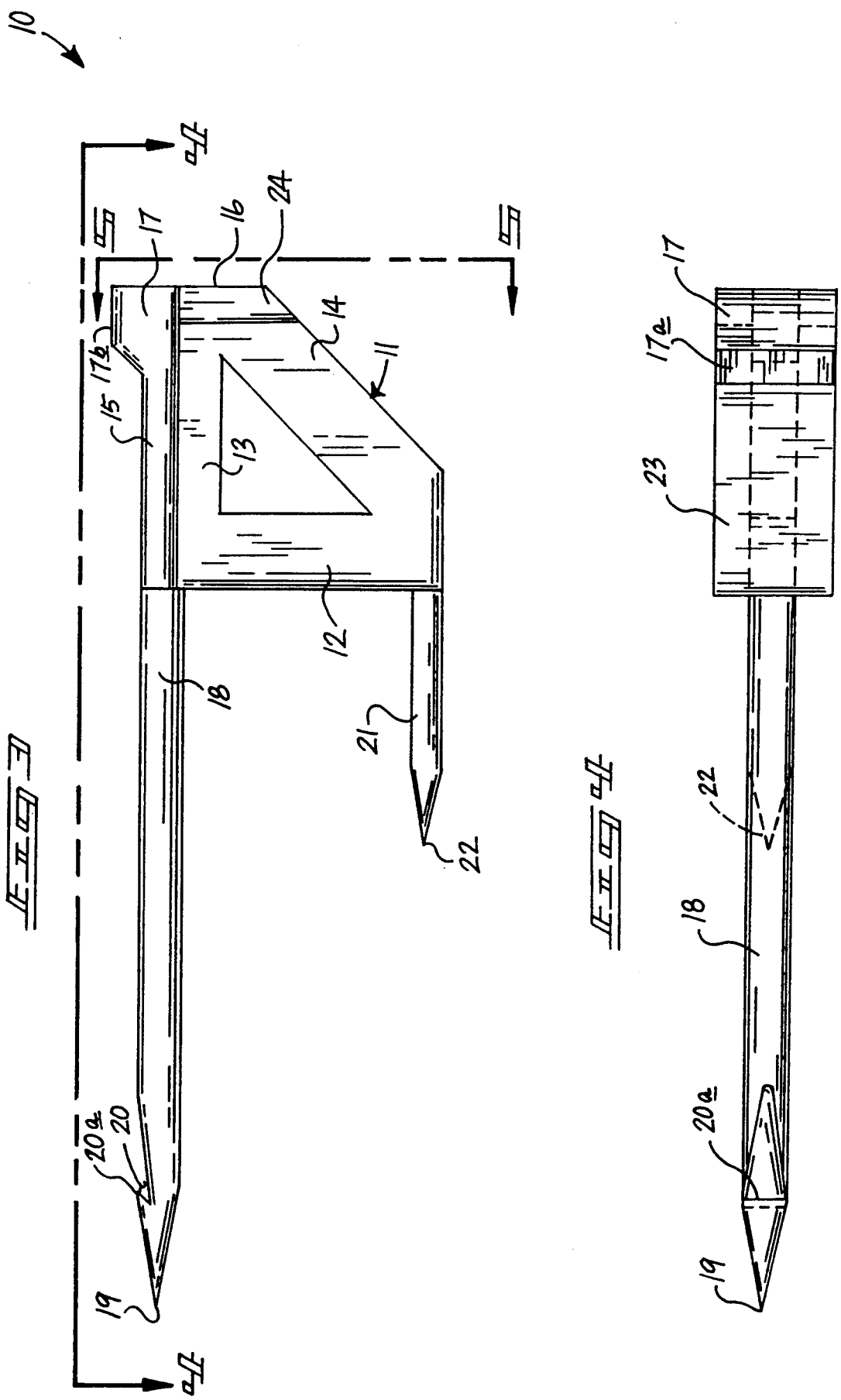

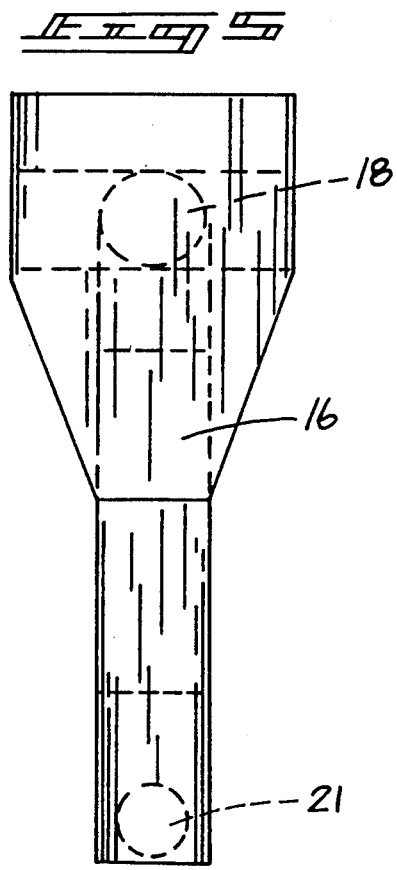
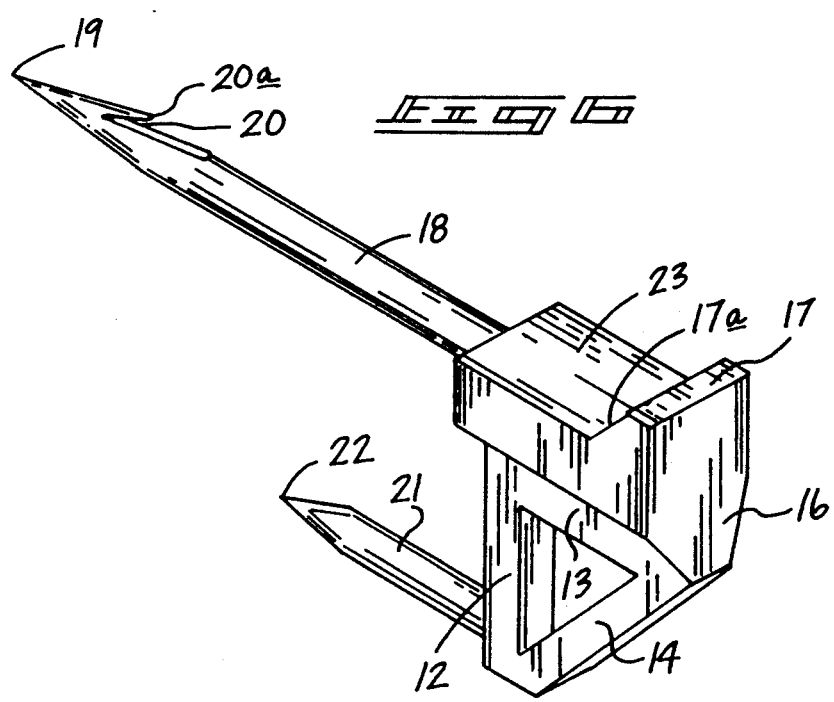

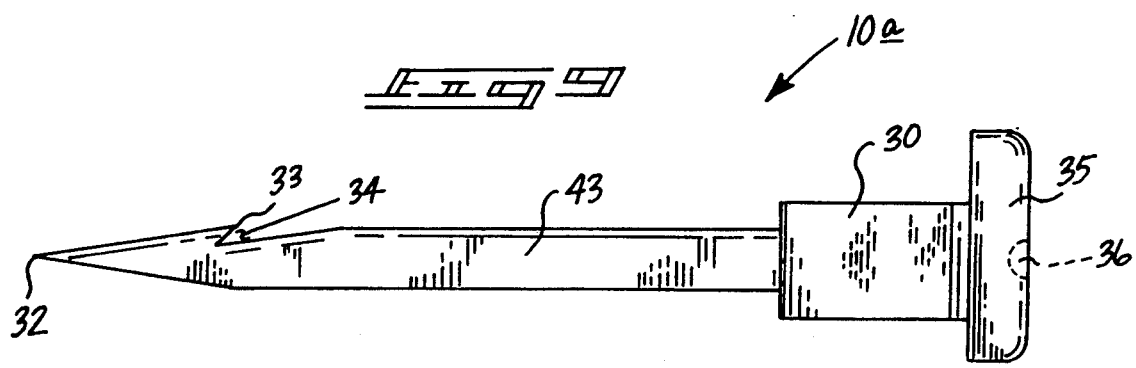
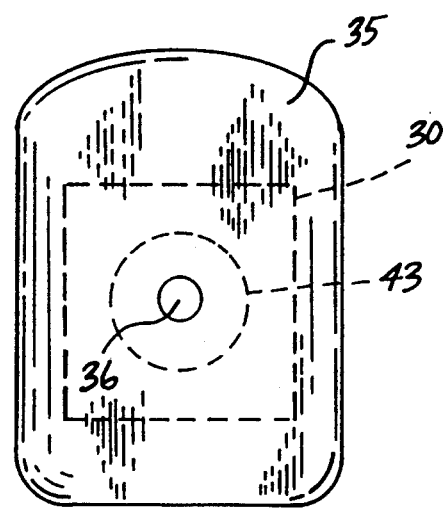

SURVEY NAIL

BACKGROUND OF THE INVENTION

1. Field of the Invention

The field of invention relates to nail structure, and more particularly pertains to a new and improved benchmark nail organization for use by surveyors and the like for providing a benchmark support surface in a surveying scenario.

2. Description of the Prior Art

Various nails and the like have been utilized in the prior art for fastening and joining of various members together. Frequently in surveying, access to a fixed landmark or support surface is unavailable due to various undeveloped terrain requiring surveying. Frequently, utility poles are utilized to provide a support surface and items such as elongate and excessively large railroad spikes are utilized to provide a sufficient support surface for an elevation rod. In utilization of such spikes, splitting and damage to associated utility poles is a result. The instant invention attempts to overcome deficiencies of the prior art by providing a desirable support surface for use by elevation rod and the like in a surveying scenario without damage to an associated utility pole.

Examples of prior art nail structures may be found for example in U.S. Pat. No. 2,533,062 to Spink wherein a nail structure utilizes a plurality of spaced spikes utilizing a web directed therebetween for securement to wires and the like to fence poles, but fails to provide a support surface as required by the invention.

U.S. Pat. No. 2,906,547 to Bortner provides for a generally "U" shaped fastener with spaced prongs for securement of various layers of sheet together.

U.S. Pat. No. 2,887,004 to Stewart provides a staple including spaced parallel legs with a planar securement web mounted therebetween.

U.S. Pat. No. 2,323,362 to Weiss provides for a further example of a staple utilizing spaced legs designed to hold insulation and the like to an underlying support surface.

As such, it may be appreciated that there continues to be a need for a new and improved benchmark nail organization as set forth by the instant invention which addresses the problem of utilization in cooperation with an elongate elevation rod for providing a benchmark support positioned in a surveying environment.

SUMMARY OF THE INVENTION

In view of the foregoing disadvantages inherent in the known types of nail structures now present in the prior art, the present invention provides a benchmark nail organization wherein the same cooperates with an elongate benchmark rod and provides a support surface for the rod in a surveying scenario. As such, the general purpose of the present invention, which will be described subsequently in greater detail, is to provide a new and improved benchmark nail organization which has all the advantages of the prior art nail structures and none of the disadvantages. It should be further noted that the improved nail structure of the instant invention providing enhanced anchoring of the shank by use of overly extending recess in the shank may further include a dimple or recess mounted within an impact or top surface of the head of the nail structure to provide a sighting or reference mark for use in sighting by surveyors and the like in situations requiring a linearly aligned reference point.

To attain this, the present invention provides a nail structure for providing a support surface for subsequent mounting and positioning of elevational rods for utilization particularly in surveying situations. The nail structure includes a first and second spike member orthogonally mounted to a lower or first leg of a generally triangular support truss head when the head is mounted to a main body support wherein the main body support provides a planar support surface and includes a projection formed at an upper terminal end of the main body support to provide a planar impact head surface for permitting directing of the nail into various structural components such as utility poles. A further improved embodiment of the instant invention includes a benchmark nail structure wherein a body member is formed with planar mounting sides for positioning indicator rods utilized in surveying. A coaxially arranged and forwardly extending shank includes a forwardly pointed tip defining a recess positioned along the shank extending rearwardly of the forwardly pointed tip to enhance engagement of the nail structure. The nail member includes an impact head orthogonally mounted to the body component, with the body component defining a top surface orthogonally arranged relative to the coaxially aligned main body and shank, with the top surface including a sighting dimple mounted in coaxial alignment with the shank to define a sighting mark for use by surveyors permitting sighting of linear sighting lines.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved benchmark nail organization which has all the advantages of the prior art nail structures and none of the disadvantages.

It is another object of the present invention to provide a new and improved benchmark nail organization which may be easily and efficiently manufactured and marketed.

It is a further object of the present invention to provide a new and improved benchmark nail organization which is of a durable and reliable construction.

An even further object of the present invention is to provide a new and improved benchmark nail organization which is susceptible of a low cost of manufacture with regard to both materials and labor, and which accordingly is then susceptible of low prices of sale to the consuming public, thereby making such benchmark nail organizations economically available to the buying public.

Still yet another object of the present invention is to provide a new and improved benchmark nail organization which provides in the apparatuses and methods of the prior art some of the advantages thereof, while simultaneously overcoming some of the disadvantages normally associated therewith.

Still another object of the present invention is to provide a new and improved benchmark nail organization cooperatively utilized in combination with an elongate elevation rod formed with gradations thereon to provide a benchmark support when the nail structure is directed into an associated vertical pole member.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is an orthographic view taken in elevation of the instant invention.

FIG. 4 is an orthographic top view, taken along the lines 4—4 of FIG. 3 in the direction indicated by the arrows.

FIG. 5 is an orthographic view, taken along the lines 5—5 of FIG. 3 in the direction indicated by the arrows.

FIG. 6 is an isometric illustration of the instant invention.

FIG. 9 is an orthographic side view of a modified aspect of the invention.

FIG. 10 is a top orthographic view of the instant invention as set forth in FIG. 9.

DESCRIPTION OF THE PREFERRED EMBODIMENT

Figure 1:
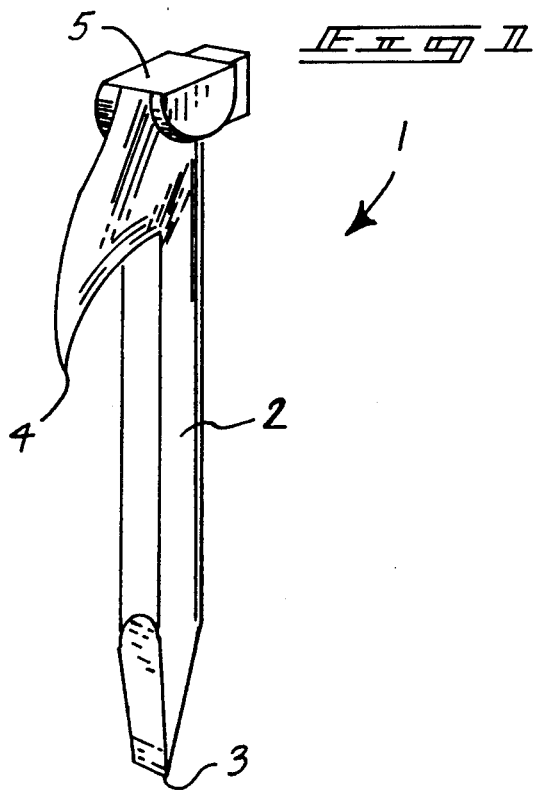
FIG. 1 is an isometric illustration of a prior art nail structure.
Figure 2:
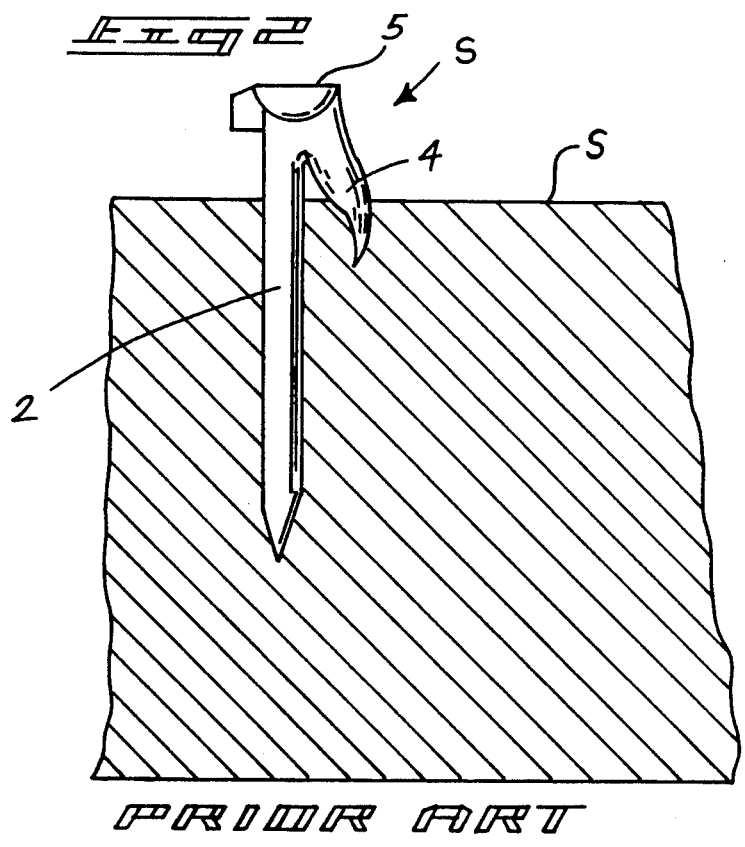
FIG. 2 is an isometric illustration of the structure of FIG. 1 secured within a support member.

With reference now to the drawings, and in particular to FIGS. 1 to 10 thereof, a new and improved benchmark nail organization embodying the principles and concepts of the present invention and generally designated by the reference numeral 10 will be described.

FIG. 1 illustrates a prior art staple structure as set forth in U.S. Pat. No. 2,386,953, including elongate shank 2 with a first short spike 4 projecting from a main head 5 and at an intersection of an upper terminal end of the main spike 2, and wherein the main spike 2 is formed with a pointed lower end 3 for projection within an associated support member "S".

More specifically, the benchmark nail organization 10 of the instant invention essentially comprises a central triangular support truss 11 including a first leg 12, a second leg 13 integrally and orthogonally mounted to the first leg 12 to define a right angle therebetween, wherein the third leg 14 defines a hypotenuse to define the triangular truss 11. A main body support 15 is formed coextensively with and integrally to an exterior surface of the second leg 13 and is formed with a main body projection 17 extending orthogonally relative to the longitudinal extent of the main body support 15. A planar impact head surface 16 is arranged orthogonally relative to the main body 15 and extends from an inner section defined by the second and third legs 13 and 14 formed with a head plate 24 arranged orthogonally to the main body support 15 with the head plate 24 arranged orthogonally to the main body support 15, with the head plate 24 including an upper surface combined with an end surface of the main body projection defined as the planar impact head surface 16 to receive impact of a hammer and the like for directing the nail member into an associated utility pole member "P" as typified in FIG. 7. On directing the nail into the pole "P", a planar main body support surface 23 that extends along the main body support to the main body projection 17 defines a planar surface arranged orthogonally relative to the impact surface 16 for support of an elevation rod 25, as illustrated in FIG. 8. The elevation rod 25 is formed with equally spaced gradations for use in a surveying situation to provide an elevational reading in surveying. As the nail member is retained within the pole "P", the benchmark surface or main body support surface 23 remains a constant for surveying purposes.

Figure 7:
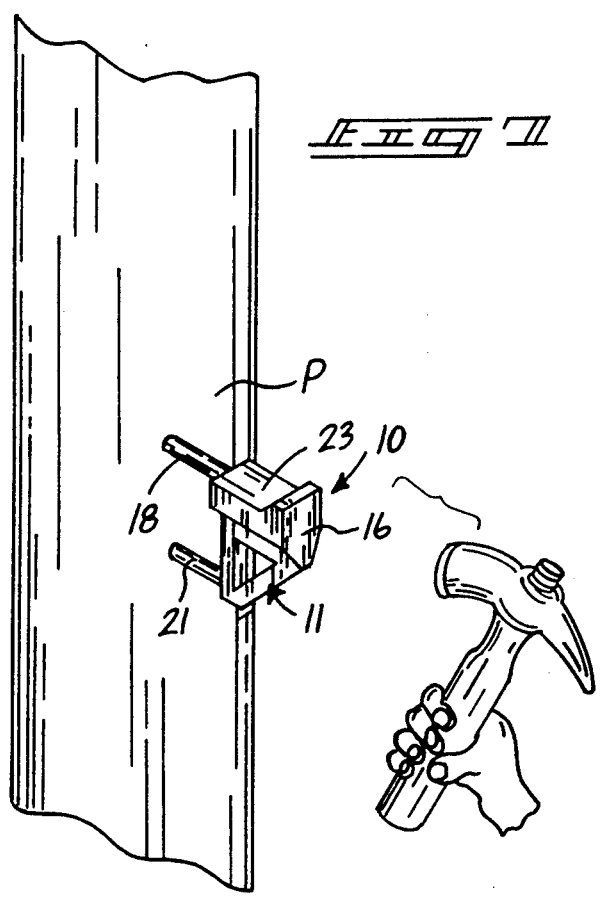
FIG. 7 is an isometric illustration of the instant invention directed into a support pole.
Figure 8:
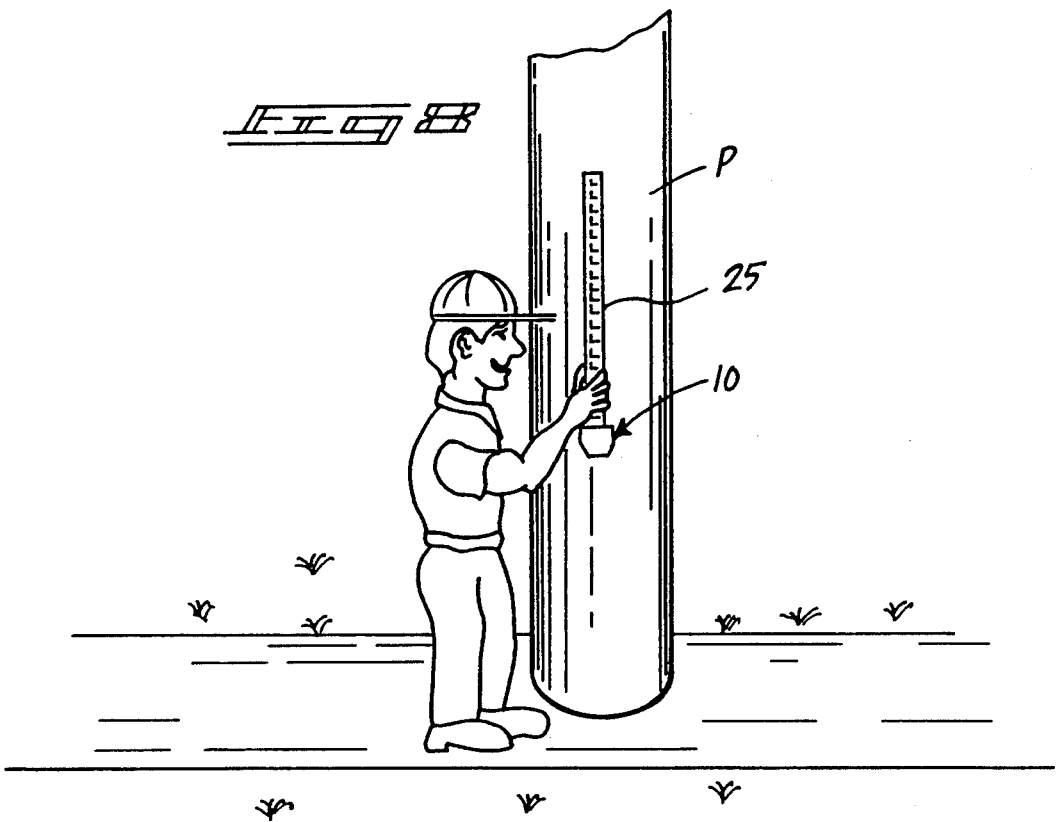
FIG. 8 is an isometric illustration of the instant invention utilized in combination with an elevation rod formed with a series of equally spaced gradations thereon mounted in association with a support surface of the nail structure.

The main body projection 17 is formed with a tapered surface 17a extending from an upper projection surface 17b that is arranged parallel to and spaced above the main body support surface 23 downwardly to the main body support surface 23 to minimize a consequence of sheer when the impact head surface 16 is impacted by the associated hammer, as illustrated in FIG. 7.

A first spike shank 18 is arranged longitudinally of and forwardly of the main body support 15 and extends to a first spike pointed end 19. A first spike recess or back cut 20 defines a rearwardly directed projection 20a to prevent removal of the nail organization when directed into the pole "P" to maintain its position as a benchmark surface by the surface 23. A second spike shank 21 parallel to the first spike shank 28 is directed orthogonally of and integrally mounted to an opposed end of the first leg 12 spaced from the main body support 15 with the second spike shank 21 terminating at a second spike pointed end 22.

FIGS. 9 and 10 cumulatively illustrate an improved benchmark nail structure 10a of the instant invention defined for enhanced ease of storage and transport during periods of non-use by surveyors and the like engaged in traverse of various geography to permit an individual engaged in a surveying activity to conveniently effect mounting of the benchmark nail structure into convenient reference locations to include utility poles, frozen earth, asphalt, and the like to provide a reference point for mounting of a graduated rule (not shown).

The benchmark nail structure includes an elongate, coaxially aligned body member 30 formed with planar sides defining a square parallelepiped configuration. The planar sides of the body member 30 are each defined by a predetermined length to accommodate mounting of a surveying rule thereon to provide a gauging reference for elevational surveying requirements. An elongate, coaxially aligned cylindrical shank 43 is coaxially aligned with the main body 30 and directs coaxially thereof from a forward end surface of the main body 30. The shank 43 is defined by a shank length greater than the predetermined length of each side of the body member to accommodate mounting of the shank within a various support or reference surface of a type as noted above. The shank 43 terminates in a forward pointed end 32 to accommodate penetration of the shank within the aforenoted support surface. The pointed end 32 is coaxially aligned relative to the elongate shank 43. A rearwardly directed spike 33 is positioned adjacent to and spaced from the pointed end 32 defining a recess 34 between the spike 33 and the shank 43, wherein an acute angle is thusly defined by the recess 34 to minimize and discourage inadvertent withdrawal of the shank 43 from the aforenoted support and further enhance stability of the shank when thusly mounted and penetrated into an associated support organization. Integrally mounted in an orthogonal relationship relative to a rear surface of the main body 30 is an enlarged impact head 35. The impact head 35 is arranged to extend outwardly of and beyond the main body 30 in a lateral orientation relative to the main body to accommodate impact of the hammer and the like for directing the benchmark nail structure into an associated utility pole member, such as member "P" or other convenient surfaces. The impact head 35 is further defined by a planar top surface which may also accommodate a graduated rule thereon when the planar top surface is oriented orthogonally relative to the planar side walls of the main body 30.

Further, a dimple or recess 36 is mounted and recessed within the top surface of the impact head 35 and is specifically aligned for coaxial alignment relative to the shank 43 and the main body 30. The coaxial alignment of the recess 36 provides for a linear line projection in various surveying situations. Accordingly, the forward point end 32 is thereby aligned with the recess 36 to permit a surveyor and the like to exactly position the center line or axis of the shank 43 and recess 36 to provide such reference without resort to various gauging and providing reference to a support surface or utility pole "P".

Reference dimensions for the benchmark nail structure of FIGS. 9 and 10 defines a shank length substantially equal to four inches, with a predetermined length of the main body equal to approximately one inch. The shank diameter is substantially defined by approximately 5/16th of an inch, with the impact head defining a generally polygonal configuration of one and one-quarter inches by ⅞th of an inch approximately in width. The dimple recess 36 is substantially ⅛ inch in diameter by 1/16th of an inch in depth.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by LETTERS PATENT of the United States is as follows:

1. A benchmark nail organization comprising, in combination,
    a support truss, the support truss including a planar impact head surface and a main body support surface, the main body support surface arranged orthogonally relative to the planar impact head surface, and
    the support truss including a first spike extending orthogonally relative to the support truss and longitudinally of the main body support surface, and
    a second spike arranged orthogonally relative to the support truss spaced from and parallel to the first spike, and
    wherein the first spike is defined by a first length and the second spike is defined by a second length, wherein the second length is less than that of the first length, and
    wherein the first spike includes a pointed outer terminal end with a back cut recess directed into the first spike adjacent the outer terminal end, and a rearwardly directed projection overlying the recess oriented in an opposed orientation to the pointed outer terminal end of the first spike, and
    wherein the truss includes a first leg, with the first leg integrally mounting the second spike orthogonally to a forward terminal end of the first leg, with the first spike orthogonally arranged adjacent to a rear end of the first leg, with the first leg integrally and orthogonally formed to a second leg, with the second leg including a main body support including a planar main body support surface formed on an exterior surface thereof, and a main body projection orthogonally oriented relative to the main body support formed at an upper terminal end of the main body support spaced from the first spike wherein the first spike is longitudinally aligned with the main body support.

2. An organization as set forth in claim 1 wherein the truss includes a first leg, with the first leg integrally mounting the second spike orthogonally to a forward terminal end of the first leg, with the first spike orthogonally arranged adjacent to a rear end of the first leg, with the first leg integrally and orthogonally formed to a second leg, with the second leg including a main body support coextensively mounted to the second leg, with the main body support including the planar main body support surface formed on an exterior surface thereof, and a main body projection orthogonally oriented relative to the main body support formed at an upper terminal end of the main body support spaced from the first spike wherein the first spike is longitudinally aligned with a lower terminal end of the main body support.

3. An organization as set forth in claim 1 wherein the main body projection includes a projection upper surface spaced from and parallel to the planar main body support surface, and a tapered projection surface directed downwardly from the projection upper surface to the planar main body support surface.

4. An organization as set forth in claim 3 wherein the projection includes an end surface coextensive with the planar impact head surface.

5. An organization as set forth in claim 3 including an elevation rod, the elevation rod arranged for mounting upon the planar main body support surface where the planar main body support surface is secured within an associated support post, the elevation rod including a series of equally spaced gradations formed coextensively of the elevation rod.

* * * * *